(12) United States Patent
Takikawa

(10) Patent No.: US 11,669,854 B2
(45) Date of Patent: Jun. 6, 2023

(54) INFORMATION MANAGEMENT DEVICE AND INFORMATION MANAGEMENT METHOD

(71) Applicant: HONDA MOTOR CO., LTD., Tokyo (JP)

(72) Inventor: Keiichi Takikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 75 days.

(21) Appl. No.: 16/980,536

(22) PCT Filed: Mar. 12, 2019

(86) PCT No.: PCT/JP2019/010025
§ 371 (c)(1),
(2) Date: Sep. 14, 2020

(87) PCT Pub. No.: WO2019/176942
PCT Pub. Date: Sep. 19, 2019

(65) Prior Publication Data
US 2021/0004861 A1    Jan. 7, 2021

(30) Foreign Application Priority Data
Mar. 16, 2018  (JP) .............................. JP2018-049407

(51) Int. Cl.
*G06Q 30/02*       (2023.01)
*G06Q 30/0235*     (2023.01)
(Continued)

(52) U.S. Cl.
CPC ..... *G06Q 30/0235* (2013.01); *G01C 21/3453* (2013.01); *G01C 21/3664* (2013.01);
(Continued)

(58) Field of Classification Search
CPC ............... G06Q 30/02; G06Q 30/0235; G06Q 30/0284; G06Q 30/04; G06Q 50/06;
(Continued)

(56) References Cited

U.S. PATENT DOCUMENTS 10,671,961 B2 *  6/2020  Cao ......................... G06Q 50/30
2016/0297316 A1 * 10/2016  Penilla ............... G06Q 30/0259
(Continued)

FOREIGN PATENT DOCUMENTS

EP        3422264 A1 *  1/2018  ............. G06Q 10/04
JP      2005-182146        7/2005
(Continued)

OTHER PUBLICATIONS

Aydin, Omer Faruk;Gokasar, Ilgin; Kalan, Onur; Lv, Chen, Matching Algorithm for improving ride-sharing by incorporating route splits and social factors, PLoS ONE, 15(3), e0229674, Mar. 4, 2020 (Year: 2020).*

Yuanyuan He; Jianbing Ni; Xinyu Wang; Ben Niu; Fenghua Le; Xuemin Shen, Privacy-Preserving Partner Selection fir Ride-Sharing Services (English), IEEEE Transaction on vehicular Technology (vol. 67, Issue: 7, pp. 5994-6005), Jul. 1, 2018 (Year: 2018).*

(Continued)

*Primary Examiner* — Marilyn G Macasiano
(74) *Attorney, Agent, or Firm* — Rankin, Hill & Clark LLP

(57) ABSTRACT

Provided is an information management device capable of prompting a first user of a general vehicle to be engaged in ride-sharing. An information management device (a server (4)) includes a ride-sharing detection unit (402), a ride-sharing path recognition unit (403), and a benefit information recognition unit (406). The benefit information recognition unit (406) recognizes benefit information for providing a benefit related to charging to the first user A of a moving body (a vehicle X) based on a move cost of a path including at least an entire ride-sharing path that is recognized by the ride-sharing path recognition unit (403).

9 Claims, 18 Drawing Sheets

(51) Int. Cl.
*G01C 21/34* (2006.01)
*G01C 21/36* (2006.01)
*G06Q 30/0283* (2023.01)
*G06Q 30/04* (2012.01)
*G06Q 50/06* (2012.01)
*G06Q 50/30* (2012.01)

(52) U.S. Cl.
CPC ..... *G01C 21/3667* (2013.01); *G06Q 30/0284* (2013.01); *G06Q 30/04* (2013.01); *G06Q 50/06* (2013.01); *G06Q 50/30* (2013.01)

(58) Field of Classification Search
CPC .... G06Q 50/30; G06Q 50/10; G06Q 30/0254; G06Q 10/067; G06Q 30/0246; G06Q 30/0207; G01C 21/3453; G01C 21/3664; G01C 21/3667; G01C 21/3438
See application file for complete search history.

(56) References Cited

U.S. PATENT DOCUMENTS

| | | | | |
|---|---|---|---|---|
| 2017/0200321 | A1* | 7/2017 | Hummel | G06Q 50/32 |
| 2018/0374014 | A1* | 12/2018 | Matsui | G06Q 50/30 |
| 2019/0228663 | A1* | 7/2019 | Meyers | G08G 1/202 |

FOREIGN PATENT DOCUMENTS

| | | |
|---|---|---|
| JP | 2010-055360 | 3/2010 |
| JP | 2013-094007 | 5/2013 |
| JP | 2015-076028 | 4/2015 |
| JP | 2016-194854 | 11/2016 |
| JP | 2017-168047 | 9/2017 |

OTHER PUBLICATIONS

International Search Report, dated Jun. 18, 2019 (dated Jun. 18, 2019), 2 pages.

* cited by examiner

FIG. 5A

| MOVING BODY ID | USER ID | BASE | PERIOD |
|---|---|---|---|
| A01 | B01 | Q11 | ... |
| A02 | B02 | Q12,Q13 | 2018/01/01-2018/03/31 |
| A02 | B03 | Q13,Q14 | 2018/04/01-2018/06/30 |
| A03 | B04 | Q15 | ... |
| A04 | B05 | Q16 | ... |
| ... | ... | ... | ... |

FIG. 5B

| MOVING BODY ID | MOVING BODY POSITION | POINT OF DEPARTURE | DESTINATION | MOVING BODY PATH |
|---|---|---|---|---|
| A01 | P11 | P21 | P31 | L1,L2,... |
| A02 | P12 | P22 | P32 | L11,L12,... |
| A03 | P13 | P23 | P33 | L21,L22,... |
| A04 | P14 | P24 | P34 | L31,L32,... |
| A05 | P15 | P25 | P35 | L41,L42,... |
| ... | ... | ... | ... | ... |

FIG. 6A

| MOVING BODY ID | USER ID | CHARGING FACILITY ID | AMOUNT | BENEFIT CODE | PERIOD | TIME SLOT |
|---|---|---|---|---|---|---|
| A01 | B01 | C01,C02,C03,... | ¥1,000 | XXXYYY01 | 2018/4/1~2018/4/30 | 23:00~07:00 |
| A02 | B03 | C01,C03,C04,... | ¥2,000 | ZZZWWW02 | ~2018/5/30 | - |
| ... | ... | ... | ... | ... | ... | ... |

FIG. 6B

| SECOND USER ID | TERMINAL ID | BASE | BILLER OF ELECTRICITY BILL | PERIOD | TIME SLOT | CHARGING FACILITY ID |
|---|---|---|---|---|---|---|
| D01 | G01 | Q21 | E01 | 2018/4/1~2018/4/30 | 23:00~07:00 | C01,C02,C03,… |
| D02 | G02 | Q22 | E02 | ~2018/5/30 | … | C01,C03,C04,… |
| … | … | … | … | … | … | … |

FIG.7A

| FACILITY ID | FACILITY POSITION | FACILITY TYPE | BURDEN | PERIOD | TIME SLOT | CHARGING FACILITY ID |
|---|---|---|---|---|---|---|
| F01 | P41 | HOSPITAL | 100% | 2018/4/1 ~2018/4/30 | 23:00~07:00 | C01,C02,C03,... |
| F02 | P42 | MOVIE THEATER | 50% | ~2018/5/30 | - | C01,C03,C04,... |
| ... | ... | ... | ... | ... | ... | ... |

FIG. 7B

| MOVING BODY ID | SECOND USER ID | RIDE-SHARING START POINT | RIDE-SHARING END POINT |
|---|---|---|---|
| A01 | D01 | P51 | P61 |
| A02 | D02 | P52 | P62 |
| ... | ... | ... | ... |

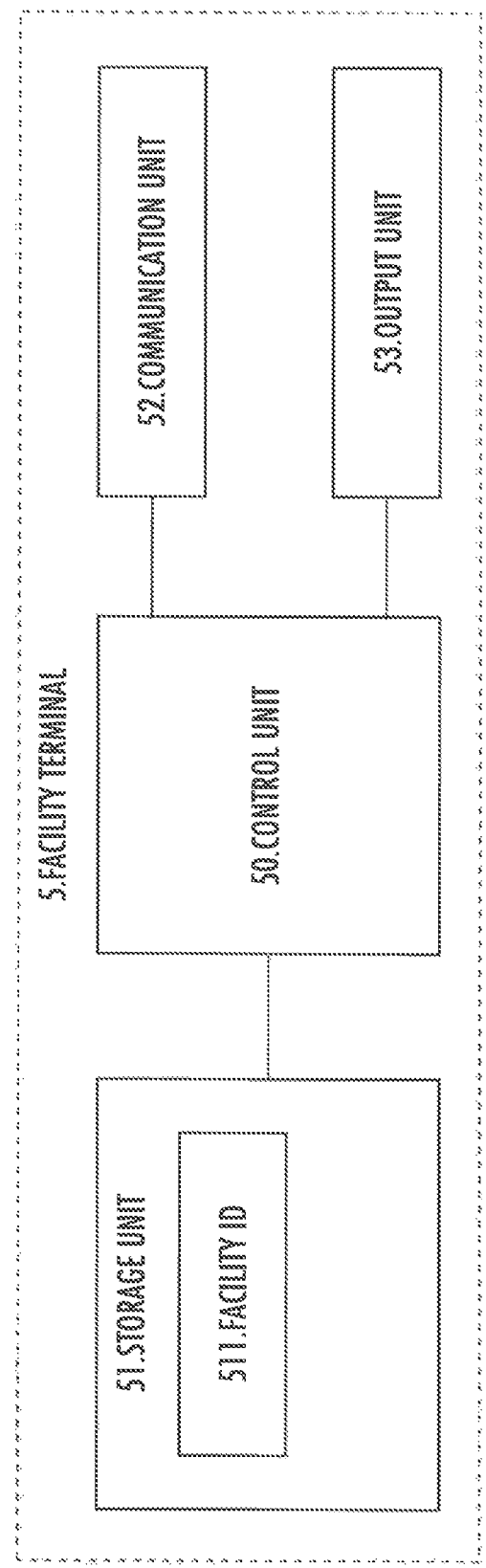

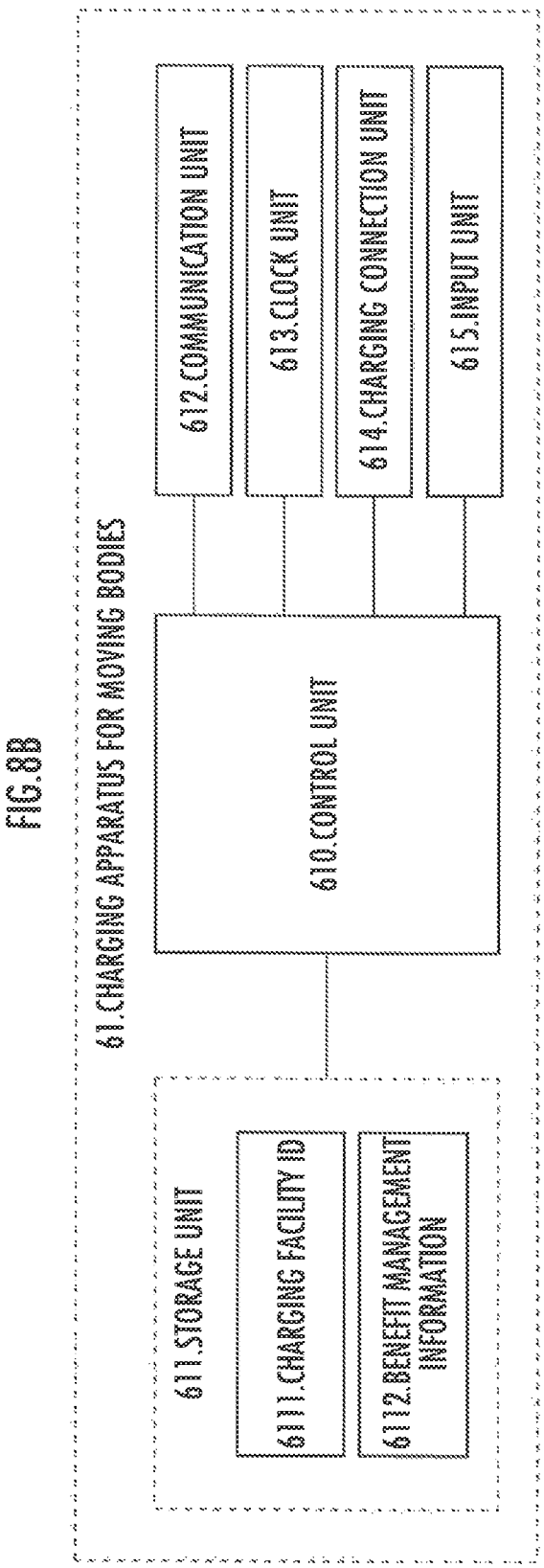

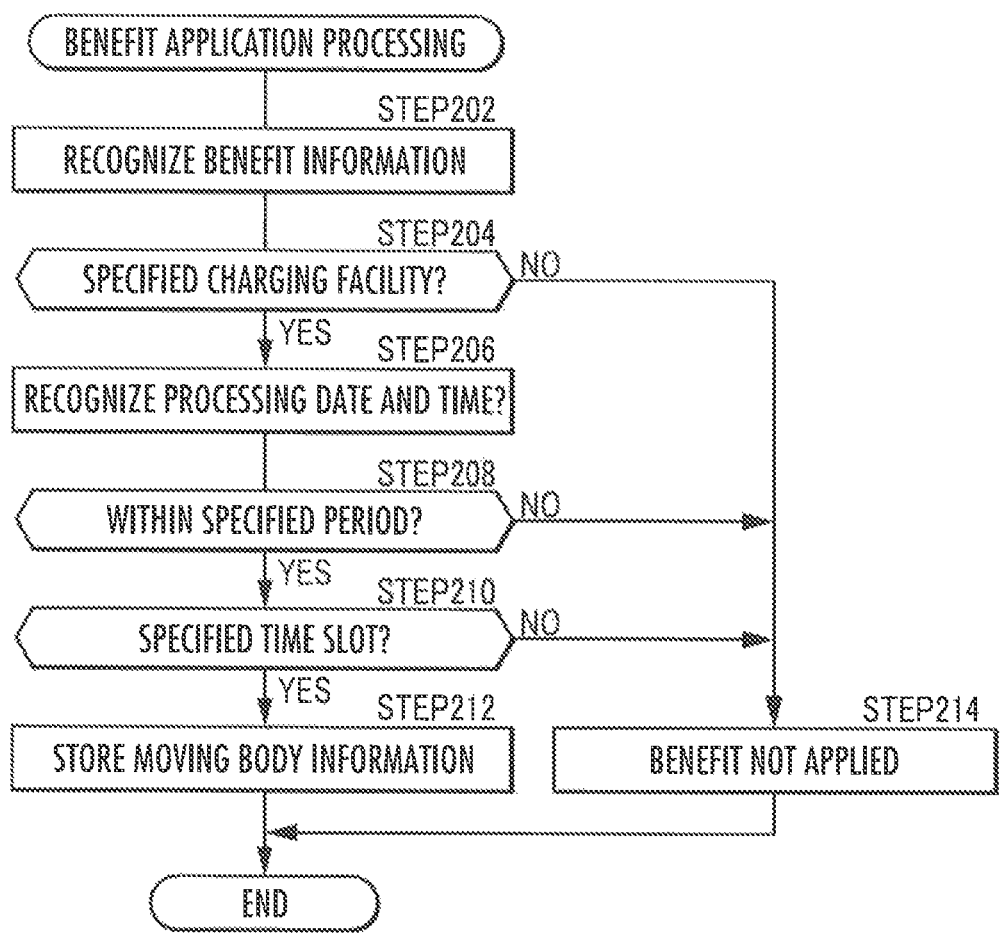

INFORMATION MANAGEMENT DEVICE AND INFORMATION MANAGEMENT METHOD

TECHNICAL FIELD

The present invention relates to an information management device and an information management method.

BACKGROUND ART

In recent years, securing transportation means has become a social issue in rural areas where public transportation by trains and buses is not well developed. In order to solve such social issues, usage of taxis or introduction of autonomous driving vehicles is conceivable. In either case, however, there is a risk that it may not be commercially viable if the operation rate thereof is low.

To supplement transportation means such as trains, buses, taxis, and autonomous driving cars, usage of ride-sharing is conceivable.

In view of such an issue, for example, Patent Literature 1 describes a ride-sharing support system including an evaluation reception unit which receives an evaluation from a user about another user who rides in the same vehicle in order to improve manners of each user in taxi sharing.

This system has a function of providing a user with a benefit such as a discounted or free fare, optional service, and the like based on the user's evaluation information.

According to the ride-sharing support system described in Patent Literature 1, it is possible to give each user a consciousness that he or she is evaluated by other users, and thus to improve manners of each user.

CITATION LIST

Patent Literature

Patent Literature 1: Japanese Patent Laid-Open No. 2017-168047

SUMMARY OF INVENTION

Technical Problem

Furthermore, spread of ride-sharing that allows another person (a second user) to ride in a private car used by a first user of a general vehicle such as a private car is also being considered as a supplement to transportation by taxis and the like.

However, if ride-sharing is left to the good will of the first user of a general vehicle, the probability that the second user can use ride-sharing when he or she desires to use it is lowered, and thus there is a risk that ride-sharing will eventually become inconvenient for the second user.

It is also conceivable to cause the first user to be actively engaged in ride-sharing by offering an incentive to the first user.

However, a general vehicle is not equipped with a function for calculating an incentive, and thus there is a risk of trouble occurring between a first user and a second user of the vehicle regarding the incentive. Furthermore, as the first user of a general vehicle does not necessarily have change, a cash settlement that may generate change is difficult. In addition, making a credit card payment is difficult for a second user who does not own a credit card or is not familiar with how to use a credit card. There is also a possibility that if the incentive other than money is offered, it may not attract interest from the first user of a general vehicle.

If such various problems exist, it is difficult to cause the first user of a general vehicle to be actively engaged in ride-sharing, and as a result, there is a risk that ride-sharing is not sufficiently spread and becomes inconvenient for the second user.

The technique described in Patent Literature 1 is based on the premise that a plurality of users use one taxi that is driven by a dedicated driver, and is not premised on ride-sharing in a general vehicle such as a private car. Accordingly, it does not solve the above problem.

In view of such problems, an object of the present invention is to provide an information management device and an information management method capable of prompting the first user of a general vehicle to be engaged in ride-sharing.

Solution to Problem

The information management device of the present invention includes a ride-sharing detection unit which detects a start and an end of ride-sharing of a second user in a moving body used by a first user, a ride-sharing path recognition unit which recognizes a move cost of a path including at least an entire ride-sharing path that is a path on which the second user has shared a ride, and a benefit information recognition unit which recognizes benefit information for providing a benefit related to charging to the first user of the moving body based on the move cost of the path including at least the entire ride-sharing path that is recognized by the ride-sharing path recognition unit.

According to the information management device of the configuration, the ride-sharing detection unit detects a start and an end of ride-sharing of a second user in a moving body. Then, the ride-sharing path recognition unit recognizes a move cost of a path including at least an entire ride-sharing path that is a path on which the second user has shared a ride.

Then, the benefit determination unit recognizes benefit information for providing a benefit related to charging to the first user of the moving body based on the move cost of a path including at least an entire ride-sharing path that is recognized by the ride-sharing path recognition unit. Thereby, even if the moving body is a general vehicle, a benefit can be determined based on the move cost of a path on which the second user has shared a ride, and thus occurrence of trouble related to an incentive between the first user and the second use of the moving body can be avoided.

Moreover, if the benefit is related to charging of a moving body, the probability is high that it is also useful for the first user of a moving body.

Therefore, according to the information management device of the configuration, it is possible to prompt a first user of a moving body including a general vehicle to be engaged in ride-sharing.

In the information management device of the present invention, it is preferable that the benefit information includes information that specifies a charging facility in which the benefit can be used.

According to the information management device of the configuration, by specifying a charging facility in the benefit information, a provider of a benefit can prompt a first user of a moving body to use a charging facility according to the intention of the provider of a benefit (for example, a charging facility of an electric power company with which the provider of a benefit has a contract, or a solar power generation system that is environmentally friendly).

In the information management device of the present invention, it is preferable that the benefit information includes information that specifies a period in which the benefit can be used.

According to the information management device of the configuration, by specifying a period in the benefit information, a provider of a benefit can prevent charging in a period against the intention of the provider of a benefit (such as at a time when the price of electric power is high, or at a time not expected by the provider of a benefit).

In the information management device of the configuration, it is preferable that the benefit information includes information that specifies an end date of the period.

According to the information management device of the configuration, by specifying an end date of the period in the benefit information, a provider of a benefit can prevent charging in a period against the intention of the provider of a benefit. Thereby, expenses and the like at a time not expected by the provider of a benefit, which is generated by charging at a time not expected by the provider of a benefit, can be prevented.

In the information management device of the configuration, it is preferable that the benefit information includes information that specifies a time slot in which charging is possible.

According to the information management device of the configuration, by specifying a time slot in which charging is possible in the benefit information, a provider of a benefit can prompt a first user of a moving body to charge during a time slot according to the intention of the provider of a benefit. Thereby, the provider of a benefit can prompt the first user of a moving body to charge during the day when the power is generized by the solar power generation system or at midnight when the power consumption is relatively small.

In the information management device of the present invention, it is preferable that the benefit information recognition unit recognizes the benefit information indicating a benefit related to charging of the moving body based on a distance of the path on which the second user has shared a ride that is recognized by the ride-sharing path recognition unit.

According to the information management device of the configuration, since the benefit information is recognized based on a distance for which the second user is carried, as compared with a case in which a benefit is recognized regardless of a distance for which the second user is carried, dissatisfaction of the first user of the moving body in ride-sharing for a long distance can be eliminated or reduced.

In the information management device of the present invention, it is preferable that a first path recognition unit which recognizes a move cost of a first path that is a path that connects a position and a destination of the moving body and does not include the entire ride-sharing path, and a second path recognition unit which recognizes a move cost of a second path that connects a position and a destination of the moving body and includes the entire ride-sharing path are included, and the benefit information recognition unit recognizes the benefit information based on a move cost of the second path and a move cost of the first path.

According to the information management device of the configuration, the benefit information is recognized based on the move cost of the second path and the move cost of the first path. Thereby, since the benefit information can be determined in consideration of the move cost or the like that has been increased in order to carry the second user, discomfort given to the first user of a moving body can be reduced or eliminated.

In the information management device of the present invention, it is preferable to include a billing information recognition unit which recognizes facility information indicating a facility at a point where the second user gets on or at a point where the second user gets off, and creates billing information based on the benefit for a facility indicated in the facility information.

According to the information management device of the configuration, the billing information recognition unit creates billing information based on the benefit for a facility at a point where the second user gets on or at a point where the second user gets off. The second user has a high probability of using or having used the facility, and if the second user had purchased a product or enjoyed a service in the facility, the facility may have been compensated, and thus possibly have made a profit. By billing such a beneficiary based on the benefit, a burden on the second user is reduced or exempted, so that the second user can be prompted to use ride-sharing. Also, if a burden on the second user is exempted, credit card registration or the like becomes unnecessary, which can further prompt the use of ride-sharing.

In the information management device of the configuration, it is preferable that a storage unit which stores identification information for identifying a terminal is included, and the ride-sharing path recognition unit is configured to recognize a path on which the second user has shared a ride based on information derived from a terminal that is identified by the identification information stored in the storage unit.

If a third party different from both of the first user and the second user of the moving body receives a bill based on the benefit, misuse of the information management device by the first user is also conceivable, such as behaving as a second user and thus pretending as if a ride were shared even though no second user shares a ride.

According to the information management device of the configuration, the ride-sharing path recognition unit can recognize a path on which the second user has shared a ride based on information derived from the terminal that is identified by the identification information stored in the storage unit.

Misuse of the information management device by way of impersonation by the first user of a moving body can be prevented by storing the identification information of the terminal carried by the second user in the storage unit in advance.

In the information management device of the configuration, it is preferable to include a storage unit which stores the second user and biller information indicating a biller of an electricity bill of the second user by associating them, and a billing information recognition unit which recognizes information for billing, for a cost based on the benefit, a biller indicated in the biller information that is associated with the second user.

According to the information management device of the configuration, the billing information recognition unit recognizes information for billing, for a cost based on the benefit, a biller indicated in the biller information associated with the second user. This biller is a biller of an electricity bill of the second user, that is, in many cases, an electric power company. Thereby, since the cost corresponding to the charging that serves a benefit can be billed for as an electricity bill of the second user, a new billing route becomes unnecessary. As it is considered that most second users utilize electricity, a second user who does not have a credit card or the like, or a second user who tends to hesitate to use it even if he or she has a credit card or the like can be prompted to use ride-sharing.

BRIEF DESCRIPTION OF DRAWINGS

FIG. 5A is a diagram showing an example of first user and moving body correspondence information.

FIG. 5B is a diagram showing an example of moving body information.

FIG. 6A is a diagram showing an example of benefit management information.

FIG. 6B is a diagram showing an example of second user information.

FIG. 7A is a diagram showing an example of facility information.

FIG. 7B is a diagram showing an example of ride-sharing information.

FIG. 8A is a diagram showing an example of a configuration of a facility terminal.

FIG. 8B is a diagram showing an example of a configuration of a charging apparatus for moving bodies.

FIG. 14 is a flowchart of a benefit application process.

DESCRIPTION OF EMBODIMENTS

Figure 1:
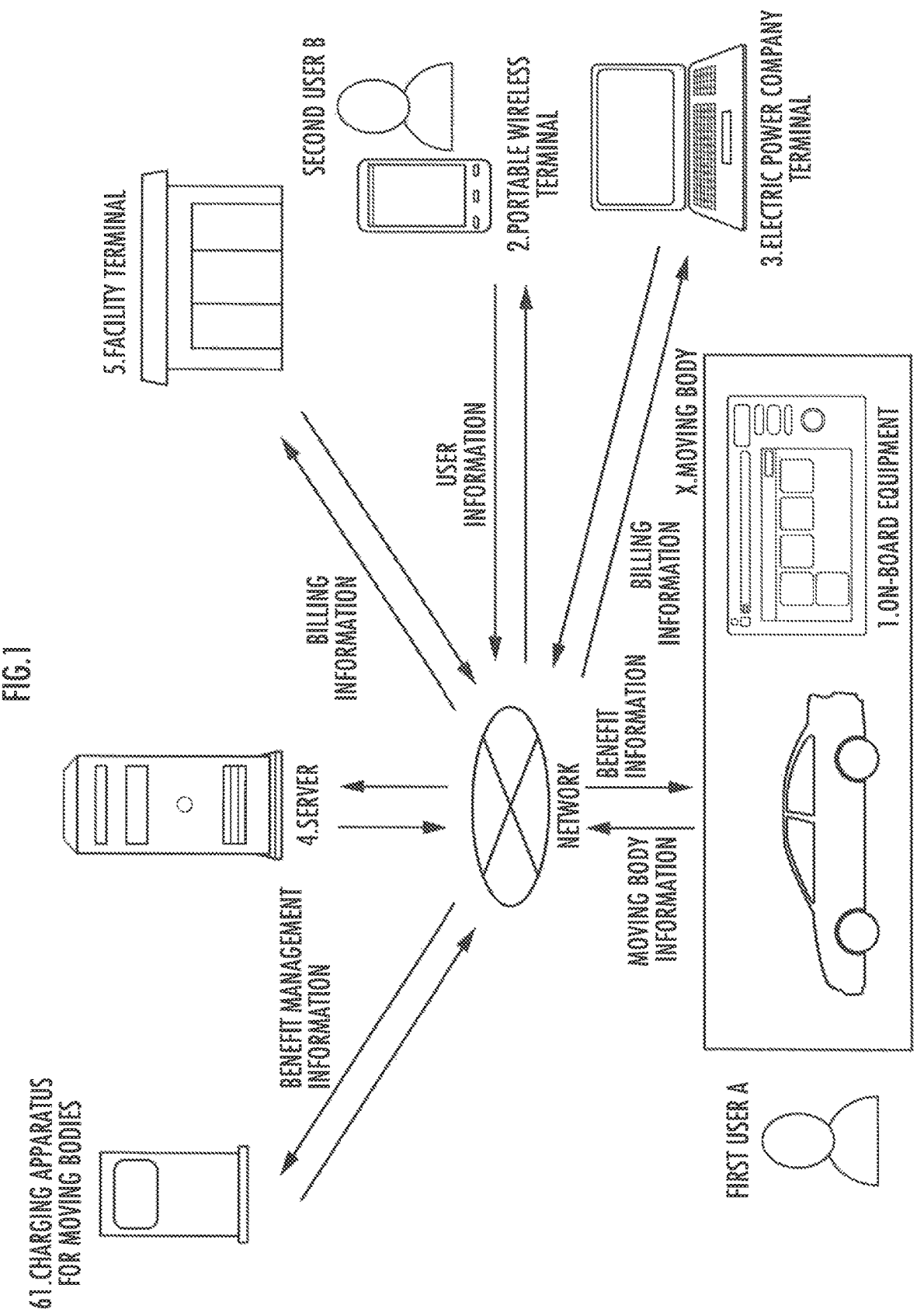
FIG. 1 is a diagram showing an overall structure of one embodiment of the present invention.

One embodiment of the present invention will be described with reference to FIGS. 1 to 14.

A basic system is configured to include an on-board equipment 1 mounted on a vehicle X (moving body), a portable wireless terminal 2 configured to be of a portable size (for example, a smartphone) an electric power company terminal 3 as a terminal of an electric power company, a server 4, a facility terminal 5 as a terminal of a facility, and a charging apparatus for moving bodies 61. The on-board equipment 1, the portable wireless terminal 2, the electric power company terminal 3, the server 4, the facility terminal 5, and the charging apparatus for moving bodies 61 have a function of communicating with each other through a network (for example, the Internet or a wireless communication network). The on-board equipment 1 and the portable wireless terminal 2 have a function of wirelessly communicating with each other by a proximity wireless method (for example, Bluetooth (registered trademark)) when they are physically close to each other such as coexisting in the space of the same vehicle X. The vehicle X is used by a first user A. The vehicle X is owned or borrowed by the first user A. Further, the portable wireless terminal 2 is used by a second user B. The electric power company terminal 3 is used by a person in charge of an electric power company that has a contract with the second user B. The facility terminal 5 is used by a person in charge of a facility that the second user B visits.

(Configuration of the On-Board Equipment)

Figure 2:
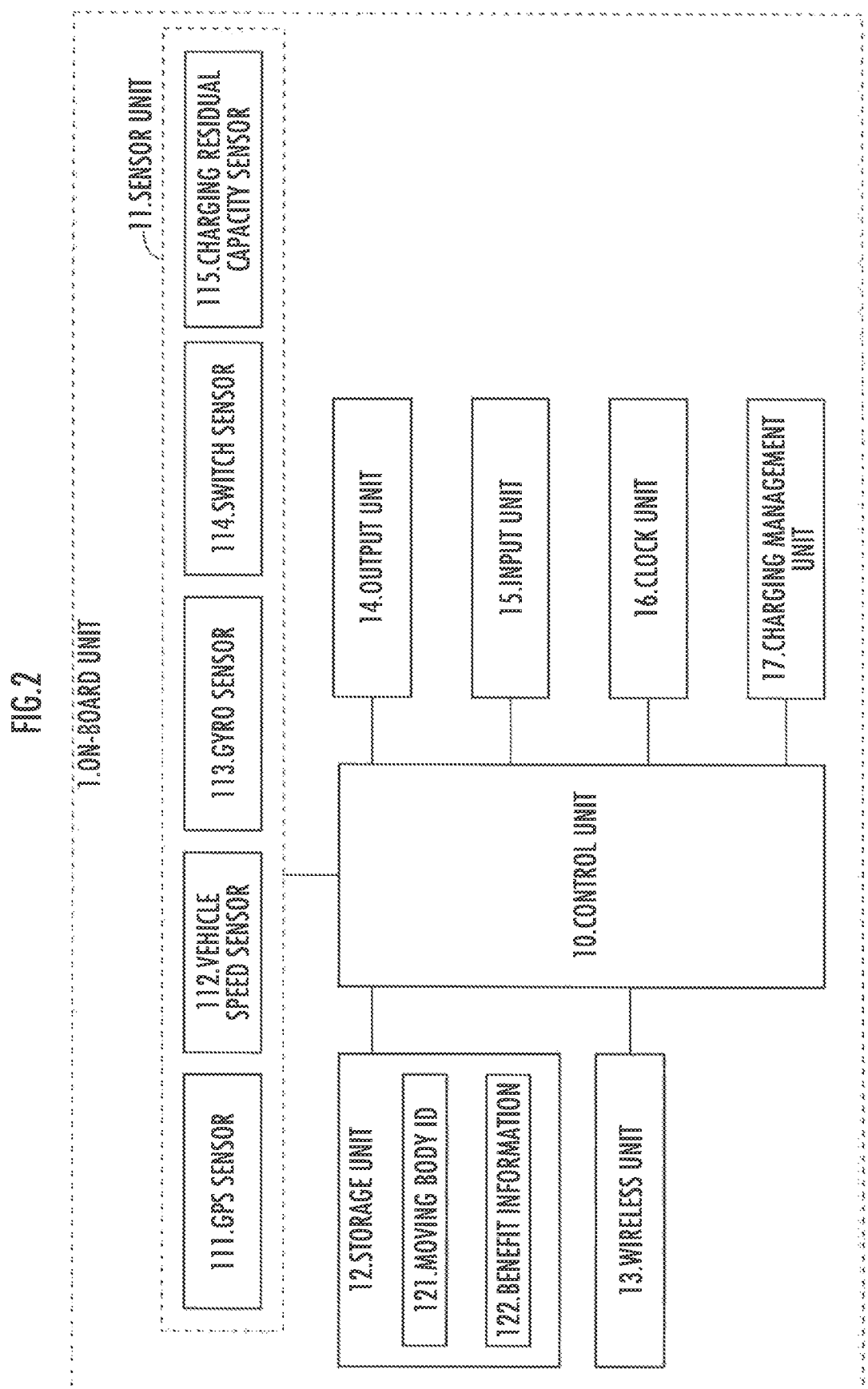
FIG. 2 is a diagram showing an example of a configuration of an on-board equipment.

As shown in FIG. 2, for example, the on-board equipment 1 includes a control unit 10, a sensor unit 11 (that is provided with a GPS sensor 111, a vehicle speed sensor 112, a gyro sensor 113, and a switch sensor 114), a storage unit 12, a wireless unit 13, an output unit 14, an input unit 15, a clock unit 16, and a charging management unit 17. A portable terminal such as a smartphone in which a predetermined application is installed may be used as the on-board equipment 1.

The control unit 10 is configured with an arithmetic device such as a CPU, for example. The arithmetic result of the arithmetic device is appropriately stored in the storage unit 12 and is read out in later processing. In order to allow signals to be input from the sensor unit 11, the storage unit 12, the wireless unit 13, the output unit 14, the input unit 15, the clock unit 16, and the charging management unit 17 and to allow control signals to output to the sensor unit 11, the storage unit 12, the wireless unit 13, the output unit 14, the input unit 15, the clock unit 16, the charging management unit 17, and the like, the control unit 10 is connected to them via a bus or the like.

A GPS sensor 111 of the sensor unit 11 calculates the current position based on a signal from a GPS (Global Positioning System) satellite. The vehicle speed sensor 112 calculates the speed of the vehicle X based on a pulse signal from a rotating shaft. The gyro sensor 113 detects an angular velocity. Because of the GPS sensor, the vehicle speed sensor, and the gyro sensor, it is possible to accurately calculate the current position and the orientation of the vehicle X.

The switch sensor 114 is configured to output a signal indicating whether a switch of a driving source of the vehicle X on which the on-board equipment 1 is mounted is in an ON state or in an OFF state.

The storage unit 12 is configured with a storage device such as a memory or an HDD.

The storage unit 12 is configured to store a moving body ID 121 as identification information for identifying the vehicle X and benefit information 122 received from the server 4 or the like.

The wireless unit 13 is configured with a communication device that performs wireless communication such as Wi-Fi: Wireless Fidelity (registered trademark), Bluetooth (registered trademark), 3G, cellular, or LTE communications.

The output unit 14 is configured, for example, with, an image display device such as a liquid crystal display and a sound output device such as a speaker. The output unit 14 is configured to output information such as an image or a sound corresponding to a control signal from the control unit 10 in a form that can be recognized by an occupant of the vehicle X through the five senses.

The input unit 15 is configured, for example, with a device capable of receiving an input of information, such as an operation reception device including a touch panel and a voice input device. The input unit 15 appropriately performs signal conversion or the like on the input information and outputs the information to the control unit 10.

The clock unit 16 is configured to be able to recognize a date and a time. The clock unit 16 is configured to be able to synchronize the time with an NTP (Network Time Protocol) server by communicating with the NTP server, for example.

It should be noted that one device "recognizes" information means all arithmetic operations to obtain the information are executed, such as: receiving the information by one device from another device; reading information stored in a storage medium connected to the one device by one device; obtaining information by one device based on a signal output from a sensor connected to the one device; deriving the information by one device by executing a predetermined arithmetic operation (such as a calculation operation or a search operation) based on received information, information stored in a storage medium, or information obtained from a sensor, receiving the information by one device from another device as a result of an arithmetic operation by the another device; and reading the information by one device from an internal storage device or an external storage device according to the received signal.

The charging management unit 17 is configured to obtain a charging state of the vehicle X, and identification information for identifying a charging facility connected to a charging unit X1 of the vehicle X by communicating with the vehicle X.

(Configuration of the Portable Wireless Terminal)

Figure 3:
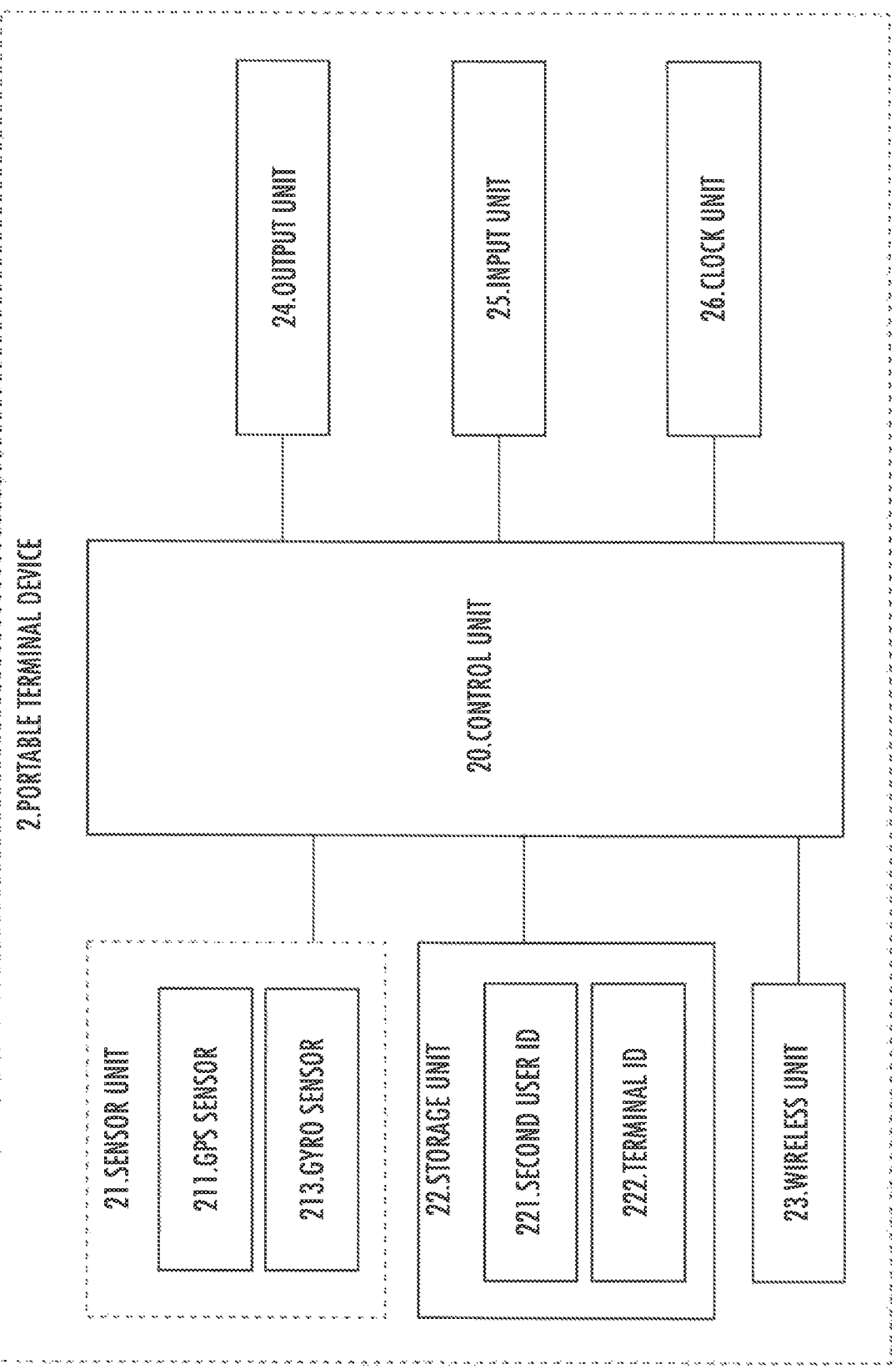
FIG. 3 is a diagram showing an example of a configuration of a portable wireless terminal.

As shown in FIG. 3, for example, the portable wireless terminal 2 includes a control unit 20, a sensor unit 21 (that is provided with a GPS sensor 211 and a gyro sensor 213), a storage unit 22, a wireless unit 23, and an output unit 24, an input unit 25, and a clock unit 26.

The storage unit 22 is configured, for example, with a memory or a hard disk, and stores a second user ID 221 that is identification information for identifying the first user of the portable wireless terminal 2 and a terminal ID 222 that is identification information for identifying the portable wireless terminal 2. The second user ID 221 is, for example, an email address of the second user B. The terminal ID 222 is, for example, a MAC address of the portable wireless terminal 2.

As the control unit 20, the sensor unit 21, the wireless unit 23, the output unit 24, the input unit 25, and the clock unit 26 of the portable wireless terminal 2 have substantially the same configuration and function as each component of the on-boar equipment 1, the descriptions thereof are omitted in the present description.

(Configuration of the Electric Power Company Terminal)

As the electric power company terminal 3 has substantially the same configuration as that of the portable wireless terminal 2 except that the storage unit stores information for identifying an electric power company, an amount of money the second user B is billed for, and the like, the description thereof is omitted.

(Configuration of the Server)

The server 4 is configured with a server computer, for example. The server corresponds to an example of the "information management device" of the present invention.

Figure 4:
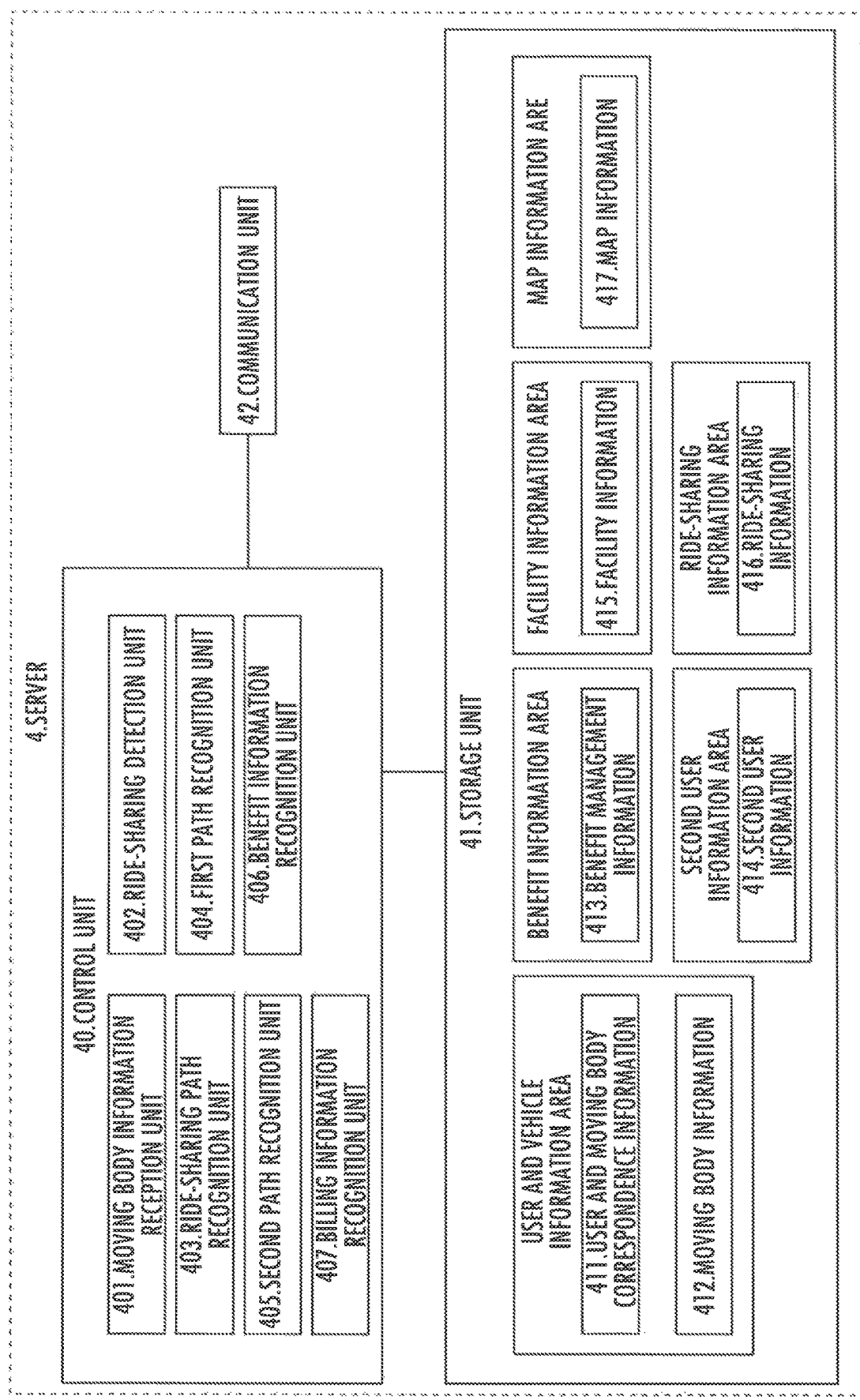
FIG. 4 is a diagram showing an example of a configuration of a server.

The server 4 includes a control unit 40, a storage unit 41, and a communication unit 42 as shown in FIG. 4.

The control unit 40 is configured with an arithmetic device such as a CPU, for example. The arithmetic result of the arithmetic device is appropriately stored in the storage unit 41 and is read out in later processing. In order to allow signals to be input from the storage unit 41 and the communication unit 42 and to allow control signals to output to the storage unit 41, the communication unit 42, and the like, the control unit 40 is connected to them via a bus or the like. By executing a predetermined program stored in the storage unit 41, the control unit functions as a moving body information reception unit 401, a ride-sharing detection unit 402, a ride-sharing path recognition unit 403, a first path recognition unit 404, a second path recognition unit 405, a benefit information recognition unit 406, and a billing information recognition unit 407 that execute later processing.

The storage unit 41 is configured with a storage device such as a memory or an HDD, for example. The storage unit 41 stores first user and moving body correspondence information 411, moving body information 412, benefit management information 413, second user information 414, facility information 415, ride-sharing information 416, and map information 417.

As shown in FIG. 5A, the first user and moving body correspondence information 411 is information that includes a moving body ID, a first user ID, and a base.

For example, in FIG. 5A, a moving body ID "A01", a first user ID "B01", and a base "Q11" are associated with each other. This means that a moving body identified by the moving body ID "A01" is used, borrowed, or owned by the first user identified by the first user ID "B01". Further, the base "Q11" indicates a place (home, work place or the like) visited by the moving body that is identified by the moving body ID "A01" or the first user that is identified by the first user ID "B01".

As in the case of a moving body ID "A02" shown in FIG. 5A, a plurality of first user IDs may be associated with one moving body ID. In this case, as shown in FIG. 5A, a period may also be associated with each of the first user ID. This means that the first user identified by each of first user IDs "B02" and "B03" uses, borrows, or owns the target moving body ID "A02" in a period associated with the first user ID.

As in the case of the moving body ID "A02" and first user IDs "B02" and "B03" shown in FIG. 5A, a plurality of bases may be associated with one moving body ID or first user ID.

The moving body ID, the first user ID, the base, and the period may be set based on information received from the on-board equipment 1, for example. In addition, from a time-series transition of the position of the moving body, a place visited at a certain frequency or higher or a place at which a stay is made for a certain period of time or longer may be set as a base.

As shown in FIG. 5B, the moving body information 412 is information that includes a moving body ID, information indicating a moving body position that is a position of the moving body identified by the moving body ID, information indicating a point of departure of the moving body, information indicating a destination of the moving body, and information indicating a moving body path that is a path connecting the position and the destination of the moving body. The information indicating a moving body position, the information indicating a point of departure of the moving body, and the information indicating a destination of the moving body are represented by a latitude and a longitude, for example. These pieces of information may further include a height. The information indicating a moving body path may also be represented by a set of a plurality of links included in the map information 417, for example.

As shown in FIG. 6A, the benefit management information 413 is information that includes a moving body ID, a first user ID, a charging facility ID, information indicating a discount amount, a benefit code, information indicating a period in which charging is possible, and information indicating a time slot in which charging is possible. The benefit management information is information indicating that the first user, who is identified by the first user ID (the first user who has used the moving body identified by the moving body ID), can enjoy a discount of the discount amount (corresponding to the "benefit" of the present invention) when charging is performed in a facility identified by a charging facility ID in a period in which charging is possible and in a time slot in which charging is possible. The benefit code is information for specifying the benefit. Using the portable wireless terminal 2, the first user can enjoy the benefit specified by the benefit code by causing the benefit code to be read by the facility terminal, the charging apparatus for moving bodies, or the like of the facility.

As shown in FIG. 6B, the second user information 414 is information that includes a second user ID of each second user, a terminal ID of a portable wireless terminal used by each second user, information indicating a position of a base of the second user, information indicating an electric power company (a biller of an electricity bill) with which the second user has a contract, information indicating a period in which charging is possible, information indicating a time slot in which charging is possible, and information indicating a charging facility ID. The second user ID, the base, the information indicating an electric power company (a biller of an electricity bill), the period in which charging is possible, the time slot specified for charging, and the charging facility ID may be set based on information received from the portable wireless terminal 2 or the electric power company terminal 3, for example. In addition, from a time-series transition of the position received from the portable wireless terminal 2, a place visited at a certain frequency or higher or a place at which a stay is made for a certain period of time or longer may be set as a base.

As shown in FIG. 7A, the facility information 415 is information that includes a facility ID of each facility, information indicating a position of the facility, information indicating a type of the facility, information indicating a burden ratio, information indicating a period in which charging is possible, information indicating a time slot in which charging is possible, and information indicating a charging facility ID. The information indicating a position of a facility is represented by a latitude and a longitude, as in the case of the moving body position. The information indicating a position of a facility may further include a height. The position of a facility may indicate, for example, one position of the facility such as the position of the center of the facility, but may be represented by a range having a certain extent such as a position of a parking lot. The information indicating a burden ratio is information indicating in what ratio the facility is burdened with the payment for the benefit. For example, if the burden ratio is 100%, it means that the facility is burdened with the entire payment for the benefit. Further, if the burden ratio is 50%, it means that the facility is burdened with half of the payment for the benefit, and a second user is burdened with the other half. Information received from the facility terminal 5 or the like may be stored as the facility information 415.

As shown in FIG. 7B, the ride-sharing information 416 is information that includes a moving body ID, a second user ID, information indicating a ride-sharing start point, and information indicating a ride-sharing end point. The information indicating a ride-sharing start point and the information indicating a ride-sharing end point are represented by a latitude and a longitude, as in the case of the moving body position. The position of the facility may further include a height.

The map information 417 is general map information in which each road, each intersection, each facility, and roads are represented by links and nodes.

The communication unit 42 is configured to be able to communicate with each of the on-board equipment 1, the portable wireless terminal 2, the electric power company terminal 3, and other external devices via a network by wired communication or wireless communication.

(Configuration of the Facility Terminal)

As shown in FIG. 8A, the facility terminal 5 includes a control unit 50, a storage unit 51, a communication unit 52, and an output unit 53. The storage unit 51 is configured with a storage device such as a memory or an HDD, for example, and stores a facility ID for identifying a facility that owns or uses the facility terminal 5 and management information of a benefit that can be used in the facility. The control unit 50, the communication unit 52, and the output unit 53 each has the same configuration as that of the control unit, the communication unit, and the output unit of the on-board equipment 1, the portable wireless terminal 2, and/or the electric power company terminal 3, respectively.

(Configuration of the Charging Apparatus for Moving Bodies)

As shown in FIG. 8B, the charging apparatus for moving bodies 61 includes a control unit 610, a storage unit 611, a communication unit 612, a clock unit 613, a charging connection unit 614, and an input unit 615. The storage unit 611 stores a charging facility ID 6111 for identifying a charging facility in which the charging apparatus is installed, and benefit management information 6112 having the same format as the benefit management information 413. The charging connection unit 614 is configured to be connectable to the charging unit of the moving body (vehicle X). The control unit 610, the communication unit 612, and the clock unit 613 each has the same configuration as that of the control unit, the communication unit, and the clock unit of the on-board equipment 1, the portable wireless terminal 2, and/or the electric power company terminal 3, respectively.

(Moving Body Information Reception Process)

Next, with reference to FIG. 9, a moving body information reception process will be described. The moving body information reception process is periodically and repeatedly carried out by the control unit 40 of the server 4. Alternatively or additionally to this, for example, the on-board equipment 1 that has received necessary information from the server 4 may execute a part of or the whole of this process.

Figure 9:
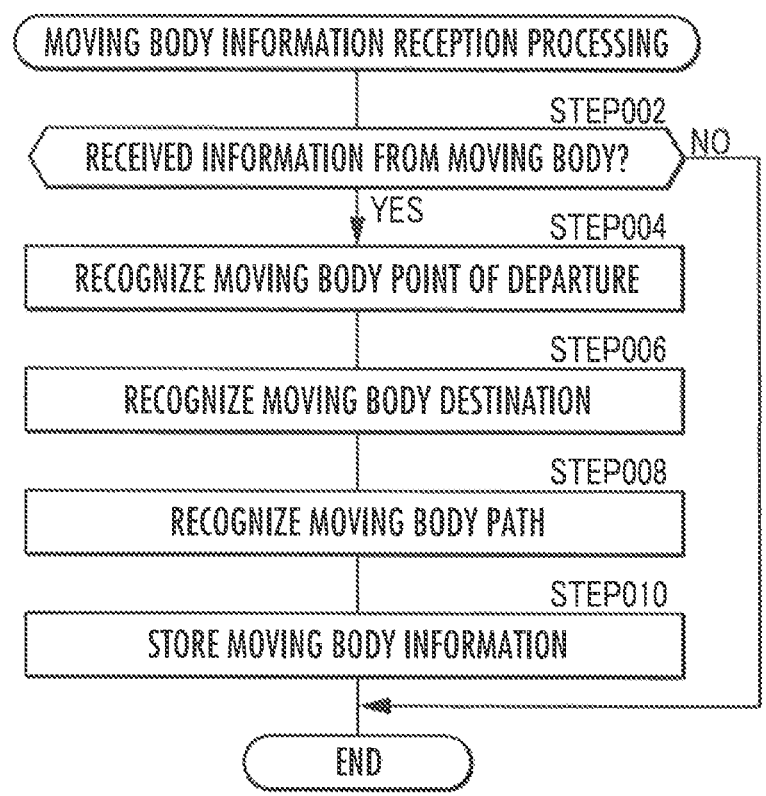
FIG. 9 is a flowchart of a moving body information reception process.

The control unit 40 (the moving body information reception unit 401) of the server 4 determines whether information is received from the moving body via the communication unit 42 (FIG. 9/STEP002). For example, the information is transmitted from the moving body at a predetermined interval (for example, every 30 seconds). The information is information that includes the moving body ID stored in the storage unit of the on-board equipment 1 and information indicating the position of the moving body.

If the determination result is negative (FIG. 9/STEP002 . . . NO), the control unit 40 of the server 4 finishes the processing.

If the determination result is affirmative (FIG. 9/STEP002 . . . YES), the control unit 40 (the moving body information reception unit 401) of the server 4 recognizes a point of departure of the moving body (FIG. 9/STEP004). The control unit 40 (the moving body information reception unit 401) of the server 4 may recognize the point of departure of the moving body from a time-series transition of the position of the moving body identified by the moving body ID, or recognize the point of departure of the moving body specified by the first user of the moving body based on the information received from the moving body.

The control unit 40 (the moving body information reception unit 401) of the server 4 recognizes a destination of the moving body from a time-series transition of the position of the moving body identified by the moving body ID (FIG. 9/STEP006).

The control unit 40 (the moving body information reception unit 401) of the server 4 may recognize the destination of the moving body specified by the first user of the moving body based on the information received from the moving body. Further, alternatively or additionally to this, the control unit 40 (the moving body information reception unit 401) of the server 4 may recognize the point, which the first user has visited at a predetermined frequency or higher that is identified by a time-series transition of the position of the moving body identified by the moving body ID and by the first user ID having been associated in the past with the moving body or the moving body ID, as a destination of the moving body. In addition, when the point of departure is different from the base of the first user identified by the first user ID associated with the moving body or the moving body ID that is indicated in the first user and moving body correspondence information 411, the control unit 40 (the moving body information reception unit 401) of the server 4 may recognize the base as a destination of the moving body.

The control unit 40 (the moving body information reception unit 401) of the server 4 recognizes a path connecting the position of the moving body and the destination of the moving body that is recognized in FIG. 9/STEP006 (hereinafter, appropriately referred to as "moving body path") by referring to the map information 417 (FIG. 9/STEP008).

The control unit 40 (the moving body information reception unit 401) of the server 4 adds information received from the moving body and information indicating the point of departure, the destination, and the path that are recognized in FIG. 9/STEP002 to STEP008 to the moving body information 412 and these pieces of information are stored (FIG. 9/STEP010).

The control unit 40 of the server 4 finishes the processing.

(Benefit Information Recognition Process)

Next, with reference to FIGS. 10 to 12, a benefit information recognition process will be described. The benefit information recognition process is periodically and repeatedly carried out by the control unit 40 of the server 4. Alternatively, or additionally to this, for example, the on-board equipment 1 that has received necessary information from the server 4 may execute a par of or the whole of this process.

Figure 10:
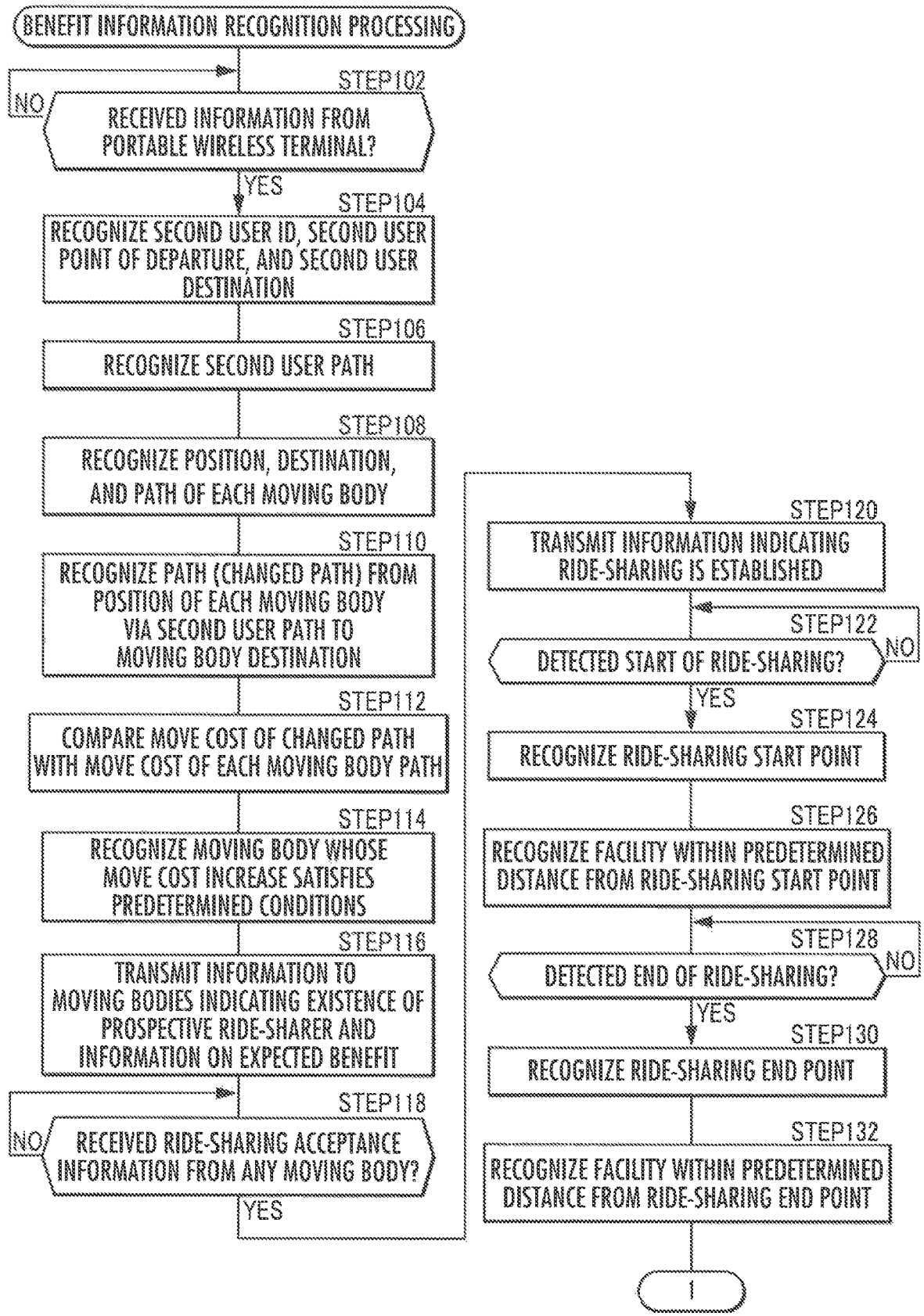
FIG. 10 is a flowchart of a first half of a benefit information recognition process.

The control unit 40 (the ride-sharing detection unit 402) of the server 4 determines whether information is received from the portable wireless terminal 2 (FIG. 10/STEP102). The portable wireless terminal 2 transmits the information, for example, in correspondence with the operation of the second user B on the website.

If the determination result is negative (FIG. 10/STEP102 . . . NO), the control unit 40 (the ride-sharing detection unit 402) of the server 4 executes the process of STEP102 again.

If the determination result is affirmative (FIG. 10/STEP102 . . . YES), the control unit 40 (the ride-sharing detection unit 402) of the server 4 recognizes the second user ID of the second user B, the point of departure of the second user B. and the destination of the second user B that are included in the received information (FIG. 10/STEP104). The point of departure of the second user B and the destination of the second user B may be information input via the input unit 25 of the portable wireless terminal 2. The control unit 40 (the ride-sharing detection unit 402) of the server 4 may recognize the base of the second user B in the second user information 414 associated with the second user ID as a point of departure of the second user B or a destination of the second user B.

The control unit 40 (the ride-sharing detection unit 402) of the server 4 recognizes a path connecting the point of departure of the second user B and the destination of the second user B (hereinafter, appropriately referred to as "second user path") by referring to the map information 417 (FIG. 10/STEP106).

The control unit 40 (the ride-sharing detection unit 402) of the server 4 recognizes the position, the destination, and the moving body path of each moving body by referring to the moving body information 412 (FIG. 10/STEP108).

The control unit 40 (the ride-sharing detection unit 402) of the server 4 recognizes a path connecting from the position of each moving body to the destination of each moving body via the second user path that is recognized in FIG. 10/STEP106 (hereinafter, appropriately referred to as "changed path") (FIG. 10/STEP110). The control unit 40 (the ride-sharing detection unit 402) of the server 4 can recognize the changed path, for example, by searching for a path from the position of each moving body to the point of departure of the second user, searching for a path from the destination of the second user to the destination of the moving body, and by combining these paths that have been searched for with the second user path.

The control unit 40 (the ride-sharing detection unit 402) of the server 4 compares a move cost of each changed path with a move cost of each moving body path (FIG. 10/STEP112). The move cost of a path is information indicating the cost for moving on the path. For example, the move cost of a path may be a value indicating a distance of the path, may be a value indicating a period of time taken to pass on the path, may be a value indicating a cost required to pass on the path, or may be a value indicating a level of easiness of driving on the path (for example, a number of traffic signals, a width of a road, a degree of a straight line, or a curvature of a road), may be a value indicating an ascending and descending degree of a slope (for example, a number of ascending and descending, a length of a slope, an inclination a slope), or may be a value derived by a combination thereof.

The move cost of a path is evaluated in such a manner that the longer the distance of the path is, the continuously or intermittently higher the move cost of the path is. Further, the move cost of a path is evaluated in such a manner that the longer it takes to pass on the path, the continuously or intermittently higher the move cost of the path is. The move cost of a path is evaluated in such a manner that the higher the cost of passing on the path is, the continuously or intermittently higher the move cost of the path is. The move cost of a path is evaluated in such a manner that the larger the number of traffic signals on the path is, the continuously or intermittently higher the move cost of the path is. The move cost of a path is evaluated in such a manner that the narrower the width of the road is, the continuously or intermittently higher the move cost of the path is. The move cost of a path is evaluated in such a manner that the larger the degree of the straight line is (the closer to the straight line the road is), the continuously or intermittently higher the move cost of the path is. The move cost of a path is evaluated in such a manner that the larger the curvature of the road on the path is, the continuously or intermittently higher the move cost of the path is. The move cost of a path is evaluated in such a manner that the larger the frequency of ascending and descending on the path is, the continuously or intermittently higher the move cost of the path is. The move cost of a path is evaluated in such a manner that the longer the length of the slope on the path is, the continuously or intermittently higher the move cost of the path is. The move cost of a path is evaluated in such a manner that the larger the inclination of the slope on the path is, the continuously or intermittently higher the move cost of the path is.

The control unit 40 (the ride-sharing detection unit 402) of the server 4 recognizes a moving body ID of the moving body whose move cost, which increases when the moving body path thereof is changed to the changed path thereof, satisfies a predetermined condition (FIG. 10/STEP114). The predetermined condition is, for example, at least one of the conditions from among a condition that the move cost that increases when the moving body path thereof is changed to the changed path thereof is a predetermined cost threshold value or less, a condition that the move cost that increases is the smallest in the moving bodies, and a condition that the move cost that increases is within the cost specified in advance by each moving body.

The control unit 40 (the ride-sharing detection unit 402) of the server 4 transmits information that includes information indicating that there is a prospective ride-sharer and information on an expected benefit to a contact address (for example, an email address as a first user ID shown in the first user and moving body correspondence information 411, or an address of the on-board equipment 1 associated with the moving body ID shown in information not illustrated) that is associated with the moving body ID recognized in FIG. 10/STEP114 (FIG. 10/STEP116). In addition to these pieces of information, the control unit 40 (the ride-sharing detection unit 402) of the server 4 may transmit, to the contact address, at least one type of information from among information indicating a distance or a time that increases when the moving body path is changed to the changed path, information indicating a charging facility in which the benefit can be enjoyed, information indicating a period in which charging is possible, and information indicating a time slot in which charging is possible. The control unit 40 (the ride-sharing detection unit 402) of the server 4 may recognize at least one type of information from among the information indicating a charging facility in which the benefit can be enjoyed, the information indicating a period in which charging is possible, and the information indicating a time slot in which charging is possible by referring to the second user information 414 of the second user B, or the facility information 415 of the facility shown at the point of departure or the destination of the second user B.

Figure 11:
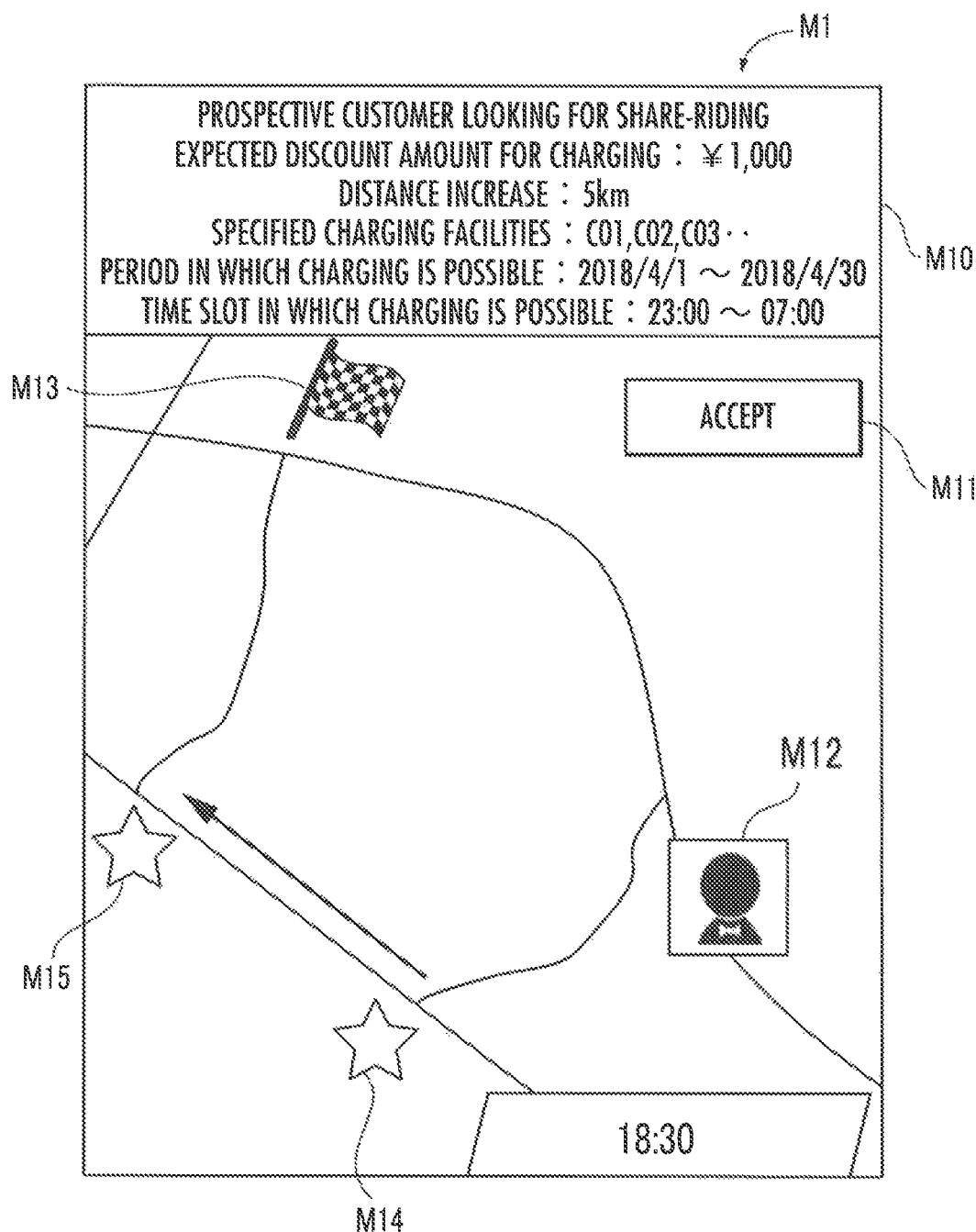
FIG. 11 is an example of a screen indicating there is a prospective ride-sharer.

Based on the received information, the terminal of the on-board equipment 1 or the like that receives this information outputs, to the output unit, a screen M1 that informs that there is a prospective ride-sharer, for example, as shown in FIG. 11. In an example illustrated in FIG. 11, the screen M1 includes a display M1 showing that there is a prospective ride-sharer, a button M11 for accepting the ride-sharing, a display M12 indicating a position of the moving body displayed on the map, a display M13 indicating a point of departure of the prospectus ride-sharer, a display M14 indicating a destination of the ride-sharer, and a display M15 indicating a destination of the moving body. In an example illustrated in FIG. 11, the display M1 showing that there is a prospective ride-sharer includes information that there is a prospective ride-sharer, information indicating an expected discount amount for charging, information indicating a distance or a period of time to be increased when a moving body path is changed to a changed path, information indicating a charging facility in which the benefit can be enjoyed, information indicating a period in which charging is possible, and information indicating a time slot in which charging is possible.

When the terminal of the on-board equipment 1 or the like detects a press of the button M11 via the input unit or detects information indicating acceptance of the ride-sharing via the voice input unit, the terminal transmits ride-sharing acceptance information indicating ride-sharing acceptance to the server 4.

The control unit 40 (the ride-sharing detection unit 402) of the server 4 determines whether the ride-sharing acceptance information is received from any of (the terminals of the on-board equipment 1 or the like of) the moving bodies (FIG. 10/STEP118).

If the determination result is negative (FIG. 10/STEP118 . . . NO), the control unit 40 (the ride-sharing detection unit 402) of the server 4 executes the process of STEP118 again.

If the determination result is affirmative (FIG. 10/STEP118 . . . YES), the control unit 40 (the ride-sharing detection unit 402) of the server 4 transmits information indicating that the ride-sharing is established to the moving body (or the terminal of the on-vehicle equipment 1 or the like of the moving body) and the portable wireless terminal 2 of the second user B (FIG. 10/STEP120). The terminal that receives the information that the ride-sharing is established outputs the information to the output unit of the terminal.

The control unit 40 (the ride-sharing detection unit 402) of the server 4 determines whether a start of ride-sharing is detected (FIG. 10/STEP122).

For example, the control unit 40 (the ride-sharing detection unit 402) of the server 4 may determine whether information indicating the position of the moving body received from the moving body (or the terminal of the on-board equipment 1 or the like of the moving body) and information indicating the position of the portable wireless terminal 2 received from the portable wireless terminal 2 are within a predetermined distance at a certain rate or higher for a certain period, and detect a start of ride-sharing when it is determined that they are within a predetermined distance at a certain rate or higher.

In addition, for example, the control unit 40 (the ride-sharing detection unit 402) of the server 4 may determine whether information such as a QR code (registered trademark) output to the moving body (or the terminal of the on-board equipment 1 or the like of the moving body) and information received from the portable wireless terminal 2 are matched, and detect a start of ride-sharing when these pieces of information are matched.

In addition, for example, when receiving the information indicating a start of ride-sharing input from the portable wireless terminal 2 via the input unit 25, the control unit 40 (the ride-sharing detection unit 402) of the server 4 may detect a start of ride-sharing.

Further, the control unit 40 (the ride-sharing detection unit 402) of the server 4 may detect a start of ride-sharing on the condition that the terminal ID of the portable wireless terminal 2 included in the received information matches the terminal ID included in the second user information 414 of the control unit 40 of the server 4.

When a door of the moving body is configured to be opened and closed via communication with the portable wireless terminal 2, the control unit 40 (the ride-sharing detection unit 402) of the server 4 may detect that a start of ride-sharing when the door of the moving body is opened by the portable wireless terminal 2.

Furthermore, the control unit 40 (the ride-sharing detection unit 402) of the server 4 may detect a start of ride-sharing on the condition that a part or all of a body (for example, a face) or a voice of the second user is detected via an imaging apparatus or a voice input device provided in the moving body.

If the determination result is negative (FIG. 10/STEP 122 . . . NO), the control unit 40 (the ride-sharing detection unit 402) of the server 4 executes the process of STEP122 again.

If the determination result is affirmative (FIG. 10/STEP122 . . . YES), the control unit 40 (the ride-sharing path recognition unit 403) of the server 4 recognizes a ride-sharing start point by the information indicating the position of the moving body or the position of the portable wireless terminal 2 (FIG. 10/STEP124).

The control unit 40 (the benefit information recognition unit 406) of the server 4 recognizes a facility ID of the facility that is within a predetermined distance from the ride-sharing start point based on the ride-sharing start point recognized in FIG. 10/STEP124 and the facility information 415 (FIG. Q/STEP126).

The control unit 40 (the ride-sharing detection unit 402) of the server 4 determines whether an end of ride-sharing is detected (FIG. 10/STEP128).

For example, the control unit 40 (the ride-sharing detection unit 402) of the server 4 may determine whether the information indicating the position of the moving body received from the moving body (or the terminal of the on-board equipment 1 or the like of the moving body) and the information indicating the position of the portable wireless terminal 2 received from the portable wireless terminal 2 are matched at a certain rate or higher, and detect an end of ride-sharing when they are not matched at a certain rate or higher.

Further, for example, the control unit 40 (the ride-sharing detection unit 402) of the server 4 may detect an end of ride-sharing when it receives information indicating an end of the ride-sharing input from the portable wireless terminal 2 via the input unit 25.

Furthermore, the control unit 40 (the ride-sharing detection unit 402) of the server 4 may detect an end of ride-sharing on the condition that it no longer detects a part or all of a body (for example, a face) or a voice of a second user via an imaging apparatus or a voice input device provided in the moving body.

It should be noted that when detecting the start of ride-sharing and the end of ride-sharing by using the portable wireless terminal 2, the control unit 40 (the ride-sharing detection unit 402) of the server 4 detects the end of ride-sharing on the condition that the terminal IDs thereof are matched.

When a door of the moving body is configured to be opened and closed via communication with the portable wireless terminal 2, the control unit 40 (the ride-sharing detection unit 402) of the server 4 may detect an end of ride-sharing when the door of the moving body is opened by the portable wireless terminal 2 after the detection of the start of ride-sharing.

Furthermore, the control unit 40 (the ride-sharing detection unit 402) of the server 4 may detect an end of ride-sharing on the condition that it no longer detects a part or all of a body or a voice of the same person as the target person detected at the start of the ride-sharing.

When the determination result is negative (FIG. 10/STEP128 . . . NO), the control unit 40 (the ride-sharing detection unit 402) of the server 4 executes the process of STEP128 again.

When the determination result is affirmative (FIG. 10/STEP128 . . . YES), the control unit 40 (the ride-sharing path recognition unit 403) of the server 4 recognizes an ride-sharing end point from the information indicating the position of the moving body or the position of the portable wireless terminal 2 (FIG. 10/STEP130).

The control unit 40 (the benefit information recognition unit 406) of the server 4 recognizes a facility ID of the facility that is within a predetermined distance from the ride-sharing end point based on the ride-sharing end point recognized in FIG. 1/STEP130 and the facility information 415 (FIG. 10/STEP132).

Figure 12:
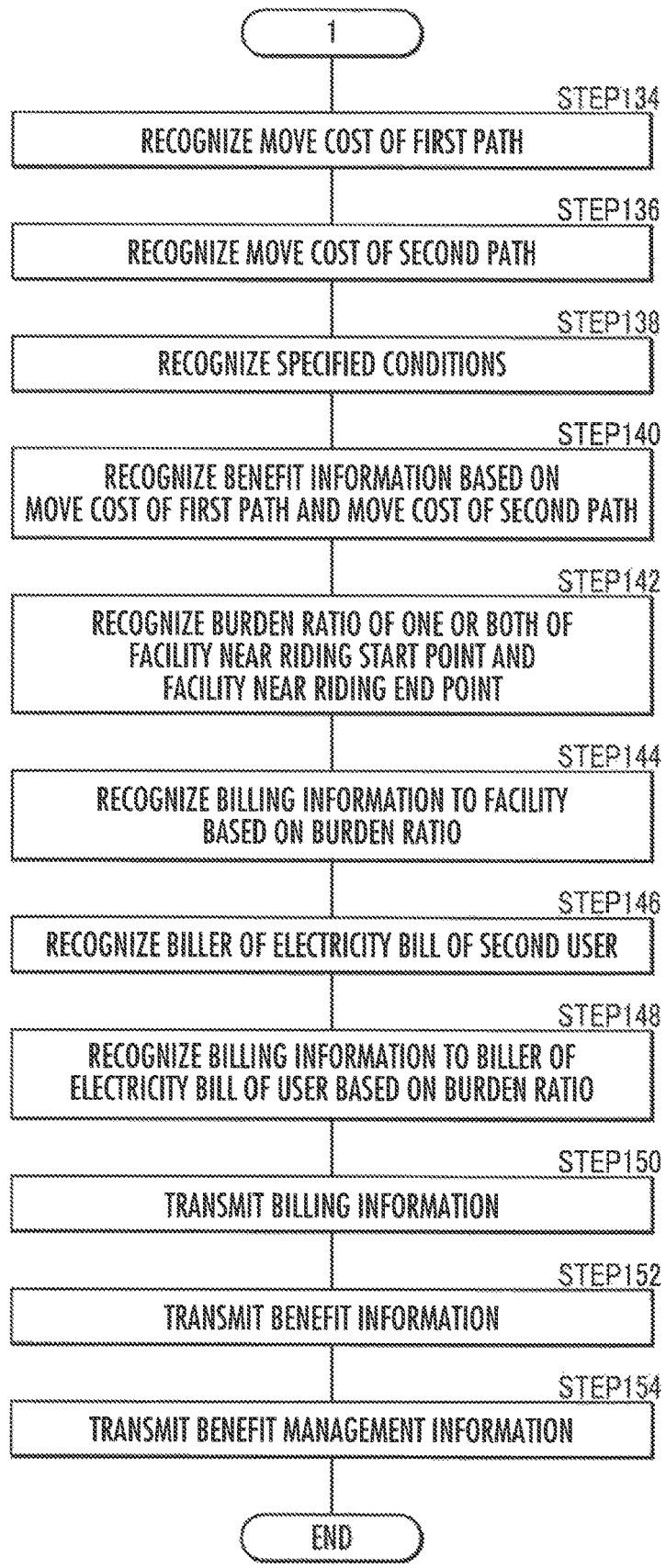
FIG. 12 is a flowchart of a second half of the benefit information recognition process.
Figure 13:
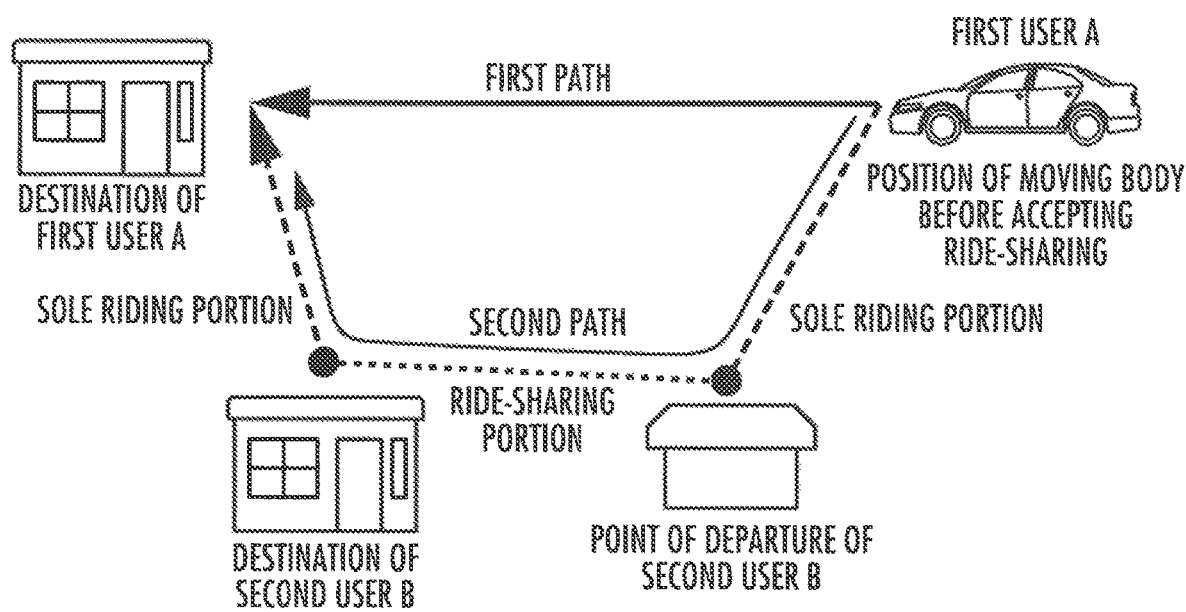
FIG. 13 is a diagram describing a first path, a second path, and a ride-sharing path.

The control unit 40 (the first path recognition unit 404) of the server 4 recognizes a move cost of the first path (refer to FIG. 13) that connects the position of the moving body before the ride-sharing acceptance and the destination of the moving body by referring to the map information 417 (FIG. 12/STEP134). In addition to the moving body destination recognized in FIG. 9/STEP006, for example, the control unit 40 (the first path recognition unit 404) of the server 4 may recognize a point at which a switch of the moving body is turned off based on a signal indicated by the GPS sensor 111 and the switch sensor 114, after the ride-sharing end point, and recognize the point as a destination of the moving body.

The control unit 40 (the second path recognition unit 405) of the server 4 recognizes a move cost of the second path (refer to FIG. 13) that connects the ride-sharing start point recognized in FIG. 10/STEP124 and the ride-sharing end point recognized in FIG. 10/STEP130 by referring to the map information 417 (FIG. 12/STEP136).

Based on the second user ID of the second user B and the facility ID recognized in FIG. 10/STEP126 and FIG. 10/STEP132, and referring to the second user information 414 and the facility information 415, the control unit 40 (the benefit information recognition unit 406) of the server 4 recognizes specified conditions for providing a benefit (a period in which charging is possible, a time slot in which charging is possible, and a charging facility ID of the charging facility in which charging is possible)(FIG. 12/STEP138). Note that the second user B may input the specified conditions via the input unit 25 of the portable wireless terminal 2 so that the information including the specified conditions may be transmitted from the portable wireless terminal 2 to the server 4.

The control unit 40 (the benefit information recognition unit 406) of the server 4 recognizes the benefit information based on the move cost of the first path and the move cost of the second path (FIG. 12/STEP140). For example, the control unit 40 (the benefit information recognition unit 406) of the server 4 may recognize the details of the benefit (for example, a discount amount for charging) based on the value obtained by subtracting the distance of the first path from the distance of the second path (that is, an increased distance). Further, for example, the control unit 40 (the benefit information recognition unit 406) of the server 4 may recognize the details of the benefit (for example, a discount amount for charging) based on the distance of the second path (ride-sharing distance). Alternatively or additionally to the distance, the details of the benefit (for example, a discount amount for charging) may be recognized based on a period of time or other move costs. The control unit 40 (the benefit information recognition unit 406) of the server 4 recognizes the benefit information in such a manner that the larger the move cost such as a distance becomes, the intermittently or continuously larger (higher in value) the benefit that the first user A can enjoy becomes.

By referring to the facility information 415, the control unit 40 (the billing information recognition unit 407) of the server 4 recognizes a burden ratio of one or both of the facility near the riding start point and the facility near the riding end point (FIG. 12/(STEP142). When the control unit 40 (the billing information recognition unit 407) of the server 4 recognizes only one of the facility near the riding start point and the facility near the riding end point, it may recognize, as a burden ratio of the facility, the burden ratio of the recognized facility as it is. When the control unit 40 (the billing information recognition unit 407) of the server 4 recognizes both of the facility near the riding start point and the facility near the riding end point, for example, it may recognize half of the burden ratio of each facility as a burden ratio of the facility.

The control unit 40 (the billing information recognition unit 407) of the server 4 recognizes billing information for the facility based on the burden ratio of each facility (FIG. 12/STEP144). For example, when the discount amount is 1.000 yen and the burden ratio of the facility near the riding start point is 50%, the control unit 40 (the billing information recognition unit 407) of the server 4 generates billing information in which an amount borne by the facility near the riding start point is 500 yen.

The control unit 40 (the billing information recognition unit 407) of the server 4 recognizes a biller of the electricity bill of the second user by referring to the second user information 414 (FIG. 12/STEP146).

The control unit 40 (the billing information recognition unit 407) of the server 4 recognizes billing information for the biller of the electricity bill of the second user based on the burden ratio (FIG. 12/STEP148). The control unit 40 (the billing information recognition unit 407) of the server 4 recognizes a burden amount of the second user based on the burden ratio of the second user obtained by deducting the burden ratio of the facility, and then generates billing information for billing the biller of the electricity bill of the second user for the burden amount.

It should be noted that when the burden ratio of the facility near the riding start point is 50% and the burden ratio of the facility near the riding end point is 25%, for example, the control unit 40 (the billing information recognition unit 407) of the server 4 recognizes 25%, which is obtained by deducting these burden ratios, as the burden ratio of the second user.

The control unit 40 (the billing information recognition unit 407) of the server 4 transmits the billing information recognized in FIG. 12/STEP144 and the billing information recognized in FIG. 12/STEP148 to the facility terminal 5 and the electric power company terminal 3, respectively (FIG. 12/STEP150).

The control unit 40 (the benefit information recognition unit 406) of the server 4 transmits information indicating a discount amount, a benefit code for receiving a discount, information indicating a period in which charging is possible, information indicating a time slot in which charging is possible, and information indicating a facility in which charging is possible to the moving body (or the terminal of the on-board equipment 1 or the like of the moving body) (FIG. 12/STEP152). Note that the benefit code may include at least one type of information form among the information indicating a discount amount, the information indicating a period in which charging is possible, the information indicating a time slot in which charging is possible, and the information indicating a facility in which charging is possible. The device that receives the information adds the received benefit information to the storage unit, and the information is stored.

The control unit 40 (the benefit information recognition unit 406) of the server 4 transmits a moving body ID indicating a moving body that can enjoy the benefit, a user ID indicating a user who can enjoy the benefit, information indicating a discount amount, a benefit code for receiving the discount, information indicating a period in which charging is possible, information indicating a time slot in which charging is possible, and information indicating a facility in which charging is possible to the charging apparatus for moving bodies 61 (FIG. 12/STEP152). The charging apparatus for moving bodies 61 adds the received benefit management information to the benefit management information 6112 of the storage unit 611, and the information is stored.

The control unit 40 of the server 4 finishes the processing.

It should be noted that the control unit 40 of the server 4 may execute the processing of FIG. 12/STEP152 first, and then execute the processing from FIG. 12/STEP142 to FIG. 12/STEP150 after the benefit is applied to the first user A.

(Benefit Application Process)

Next, with reference to FIG. 14, a benefit application process will be described. This process is executed by the control unit 610 of the charging apparatus for moving bodies 61. Alternatively or additionally to this, for example, the server 4 that has received necessary information from the charging apparatus for moving bodies 61 may execute a part or the whole of this process.

The control unit 610 of the charging apparatus for moving bodies 61 recognizes benefit information (FIG. 14/STEP202). For example, the control unit 610 of the charging apparatus for moving bodies 61 may recognize benefit information such as a benefit code input via the input unit 615 of the charging apparatus for moving bodies 61. Further, the control unit 610 of the charging apparatus for moving bodies 61 may recognize benefit information such as a benefit code by communicating with the moving body (or the terminal of the on-board equipment 1 or the like of the moving body) via the communication unit 612. The benefit information includes information indicating a discount amount, a benefit code for receiving a discount, information indicating a period in which charging is possible, information indicating a time slot in which charging is possible, and information indicating a facility in which charging is possible.

The control unit 610 of the charging apparatus for moving bodies 61 determines whether the charging facility in which it is equipped is a charging facility targeted for a benefit (FIG. 14/STEP204). For example, the control unit 610 of the charging apparatus for moving bodies 61 determines whether the charging facility ID indicated in the benefit information matches the charging facility ID stored in the storage unit 611.

If the determination result is affirmative (FIG. 14/STEP204 . . . YES), the control unit 610 of the charging apparatus for moving bodies 61 recognizes a processing date and a processing time by referring to the clock unit 613 (FIG. 14/STEP206).

The control unit 610 of the charging apparatus for moving bodies 61 determines whether the processing date recognized in FIG. 14/STEP206 is included in the period in which charging is possible that is indicated in the benefit information (FIG. 14/STEP208).

If the determination result is affirmative (FIG. 14/STEP208 . . . YES), the control unit 610 of the charging apparatus for moving bodies 61 recognizes whether the processing time recognized in FIG. 14/STEP206 is included in the time slot in which charging is possible that is indicated in the benefit information (FIG. 14/STEP210).

If the determination result is affirmative (FIG. 14/STEP210 . . . YES), the control unit 610 of the charging apparatus for moving bodies 61 applies the benefit (FIG. 14/STEP212). Specifically, the control unit 610 of the charging apparatus for moving bodies 61 deducts a discount amount indicated in the benefit information from the cost for charging.

If the determination result of any of FIG. 14/STEP204. FIG. 14/STEP208, and FIG. 14/STEP210 is negative (FIG. 14/STEP204 . . . NO. FIG. 14/STEP208 . . . NO, or FIG. 14/STEP210 . . . NO), the control unit 610 of the charging apparatus for moving bodies 61 does not apply the benefit (FIG. 14/STEP214).

The control unit 610 of the charging apparatus for moving bodies 61 finishes the processing.

(Modification)

When the control unit 40 (the benefit information recognition unit 406) of the server 4 detects a ride shared by a plurality of second users, it may execute a process of providing the benefit of each second user to the first user, or it can execute a process of providing the benefit to the first user in such a manner as to reduce a burden of each of the plurality of second users or of a facility.

The above-described system is also applicable to the case in which a vehicle X used by a taxi driver or the like is carrying a first user (a person who has got on the vehicle first) and the driver accepts a request by a second user for ride-sharing.

REFERENCE SIGNS LIST

4 Server
40 Control unit
41 Storage unit
401 Moving body information reception unit
402 Ride-sharing detection unit
403 Ride-sharing path recognition unit
404 First path recognition unit
405 Second path recognition unit
406 Benefit information recognition unit
407 Billing information recognition unit

The invention claimed is:

1. An information management device, comprising:
a control unit configured with a CPU; and a communication unit configured to wirelessly communicate the control unit with an on-board unit of a moving body, the on-board unit including an on-board unit CPU, wherein the control unit is configured to:
detect a start and an end of ride-sharing of a second user who is different from a first user in a moving body used by the first user at a same time as the first user, the start of ride-sharing of the second user being later than a start of use of the moving body by the first user, and the end of ride-sharing of the second user being earlier than an end of use of the moving body by the first user,
recognize a move cost of a path including at least an entire ride-sharing path that is a path on which the second user has shared a ride,
recognize benefit information for providing a benefit related to charging to the first user of the moving body based on the move cost of the path including at least the entire ride-sharing path that is recognized,
recognize facility information indicating a facility at a point where the second user gets on or at a point where the second user gets off, and then create billing information based on the benefit for the facility indicated in the facility information, and
control the communication unit to transmit the benefit information and the billing information to the on-board unit of the moving body, and
wherein the benefit information indicates a benefit related to charging of the moving body based on a distance of the path on which the second user has shared a ride that is recognized.

2. The information management device according to claim 1, wherein
the benefit information includes information that specifies a charging facility in which the benefit can be used.

3. The information management device according to claim 1, wherein
the benefit information includes information that specifies a period in which the benefit can be used.

4. The information management device according to claim 3, wherein
the benefit information includes information that specifies an end of the period.

5. The information management device according to claim 1, wherein
the benefit information includes information that specifies a time slot in which charging is possible.

6. The information management device according to claim 1, wherein the control unit is further configured to
recognize a move cost of a first path that is a path that connects a position and a destination of the moving body and does not include the entire ride-sharing path, and
recognize a move cost of a second path that connects a position and a destination of the moving body and includes the entire ride-sharing path, wherein
the benefit information is recognized based on the move cost of the second path and the move cost of the first path.

7. The information management device according to claim 1, further comprising
a storage device including a memory, the storage device configured to store identification information for identifying a terminal, wherein
the control unit is further configured to recognize the path on which the second user has shared a ride based on information derived from a terminal that is identified by the identification information stored in the storage device.

8. The information management device according to claim 1, further comprising
a storage device including a memory, the storage device configured to store the second user and biller information indicating a biller of an electricity bill of the second user by associating them, and
the control unit is further configured to recognize information for billing, for a cost based on the benefit, the biller indicated in the biller information that is associated with the second user.

9. An information management method executed by a control unit configured with a CPU and configured to wirelessly communicate with an on-board unit of a moving body via a communication unit, wherein the on-board unit includes an on-board unit CPU, the method comprising:
a step of using the control unit to detect a start and an end of ride-sharing of a second user who is different from a first user in a moving body used by the first user at a same time as the first user, the start of ride-sharing of the second user being later than a start of use of the moving body by the first user, and the end of ride-sharing of the second user being earlier than an end of use of the moving body by the first user;

a step of using the control unit to recognize a move cost of a path including at least an entire ride-sharing path that is a path on which the second user has shared a ride;

a step of using the control unit to recognize benefit information for providing a benefit related to charging to the first user of the moving body based on the move cost of the path including at least the entire ride-sharing path;

a step of using the control unit to recognize facility information indicating a facility at a point where the second user gets on or at a point where the second user gets off, and then create billing information based on the benefit for the facility indicated in the facility information;

a step of using the control unit to control the communication unit to transmit the benefit information and the billing information to the on-board unit of the moving body, wherein the benefit information indicates a benefit related to charging of the moving body based on a distance of the path on which the second user has shared a ride that is recognized.

* * * * *